(12) United States Patent
Rodgers

(10) Patent No.: US 6,902,183 B2
(45) Date of Patent: Jun. 7, 2005

(54) TOW HOOK HITCH ASSEMBLY AND METHOD

(76) Inventor: E. Walter Rodgers, 5650 W. Marconi, Glendale, AZ (US) 85306

( * ) Notice: Subject to any disclaimer, the term of this patent is extended or adjusted under 35 U.S.C. 154(b) by 0 days.

(21) Appl. No.: 10/657,478

(22) Filed: Sep. 8, 2003

(65) Prior Publication Data

US 2005/0051994 A1   Mar. 10, 2005

(51) Int. Cl.⁷ .............................................. B60D 1/04
(52) U.S. Cl. ...................................... 280/514; 280/504
(58) Field of Search ............................... 280/504, 505, 280/507, 514, 495, 500, 502, 408, 477, 481, 280/491.5

(56) References Cited

U.S. PATENT DOCUMENTS

| | | | | |
|---|---|---|---|---|
| 4,714,265 | A | 12/1987 | Franklin | 280/491 |
| 5,054,806 | A * | 10/1991 | Chester | 280/495 |
| 5,088,754 | A | 2/1992 | Skelton | 280/491.3 |
| 5,150,911 | A * | 9/1992 | Williams | 280/502 |
| 5,716,066 | A * | 2/1998 | Chou et al. | 280/501 |
| 5,755,454 | A * | 5/1998 | Peterson | 280/491.1 |
| 6,283,490 | B1 | 9/2001 | Sciannanteno et al. | 280/493 |
| 6,457,733 | B1 | 10/2002 | Hansen | 280/481 |
| 6,457,734 | B1 | 10/2002 | Hansen | 280/481 |
| 6,672,609 | B2 * | 1/2004 | Pierman et al. | 280/504 |
| 6,685,212 | B1 | 2/2004 | Penlerick et al. | 280/496 |
| 2004/0090041 | A1 * | 5/2004 | Lenzen et al. | 280/491.5 |

FOREIGN PATENT DOCUMENTS

DE      10041063   *  5/2001   ............. F16B 7/00

* cited by examiner

Primary Examiner—Avraham Lerner
(74) Attorney, Agent, or Firm—Cahill, von Hellens, & Glazer, P.L.C.

(57) ABSTRACT

A tow hook hitch assembly attaches to one or both of the front tow hooks provided on a four wheel drive vehicle for mounting a tow ball, winch, or other accessory to the front end of the vehicle. The tow hook hitch includes an upper member extending above the tow hook, a lower member extending below the tow hook, a shaped insert secured to the upper member or lower member for extending within the tow hook, and a clamp bolt for securing the aforementioned components together.

7 Claims, 4 Drawing Sheets

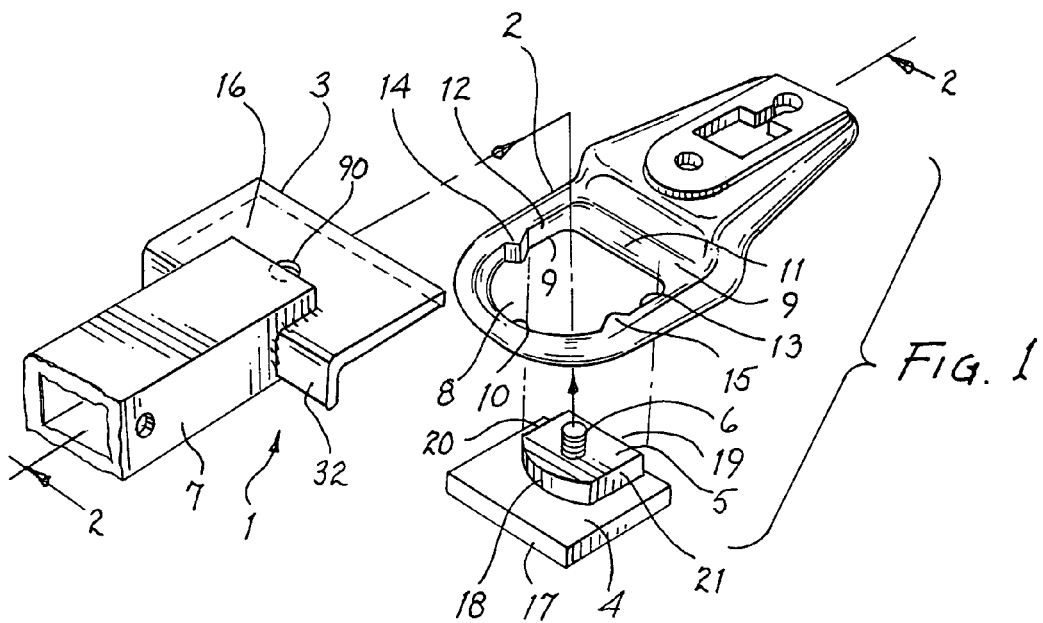
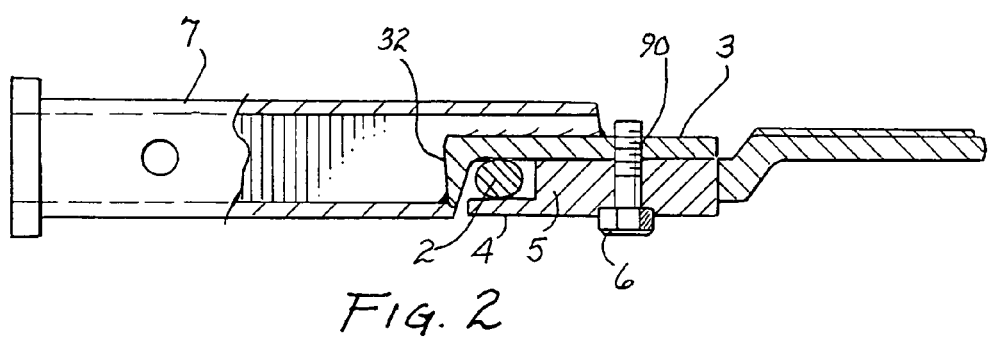

TOW HOOK HITCH ASSEMBLY AND METHOD

BACKGROUND OF THE INVENTION

1. Field of the Invention

This invention relates to a tow hook hitch assembly and method for securely mounting a hitch assembly to one or both tow hooks provided on the front end of a vehicle.

2. Description of the Related Art

Four wheel drive vehicles, including pickup trucks and sport utility vehicles, are often provided with a pair of front tow hooks extending through, or just below, the front bumper of the vehicle. In some cases, a pair of rear tow hooks are also provided. Such tow hooks are typically used to pull the vehicle out of rough, muddy, or snowy terrain after the vehicle has become stuck. A chain, cable or strap can be coupled to the tow hooks of the disabled vehicle and extended to another towing vehicle to help pull the disabled vehicle out of such terrain.

In the past, owners of four wheel drive vehicles have often desired to mount a motorized winch to the front of their vehicles. However, the front bumpers equipped by the manufacturer of the vehicle often interfered with the attachment of such winches to the vehicle. Accordingly, the vehicle owner would typically need to replace the original front bumper with a replacement that would accommodate a winch, often at significant expense.

Those skilled in the art have also disclosed the use of such tow hooks for other purposes. For example, in U.S. Pat. Nos. 4,457,733 and 4,457,734, both issued to Hansen, a front hitch assembly is disclosed whereby the front left and right tow hooks of a vehicle are used to releasably mount a center trailer hitch type receiver on the front end of the vehicle. This center receiver can then be used to support a winch, a bicycle rack, or a towing hitch ball. The Hansen front hitch assembly includes an elongated frame member having openings at its ends for receiving the left and right tow hooks of the vehicle. A horizontal surface of the frame member rests upon the upper surfaces of the tow hooks. Left and right threaded bolts are engaged with the frame member at its opposing ends. Each bolt is tightened until the end of the bolt directly contacts the underside of its associated tow hook. In this manner, the bolt effectively pulls the horizontal surface of the frame member downwardly against the upper surface of the tow hook.

The Hansen tow hook attachment method described above suffers from several disadvantages. First, because it is only the end portion of each tightening bolt that actually contacts the lower surface of the tow hook, the tow hook can not be reliably wedged between the horizontal surface of the frame member and the end of the tightening bolt. This is particularly true if vertical loading having a twisting moment is applied to the frame member. Secondly, some of the tow hooks that are provided on such vehicles are made of relatively soft aluminum, and the tightening of the end of Hansen's attachment bolt into an aluminum tow hook will wear away the tow hook. Thirdly, while Hansen's attachment method may limit vertical (i.e., upward and downward) movement of the frame member relative to the tow hook, Hansen's attachment method does not limit lateral rotational movement of the frame member relative to the tow hook. This fact may not present a problem when the frame member is attached to both left and right tow hooks in the manner already described, but it does present a problem if it were desired to attach the frame member to only a single tow hook. The tow hitch assembly disclosed by Hansen must be attached to both tow hooks before it can be used.

Accordingly, it is an object of the present invention to provide a tow hitch assembly and method for mounting a tow hitch to a tow hook in a secure and sturdy manner.

It is another object of the present invention to provide a tow hook hitch assembly and method for mounting a tow hitch to either one or two tow hooks provided on a vehicle.

It is yet another object of the present invention to provide a tow hook hitch assembly which may be used with different types of hooks, including "U" and "J" shaped hooks, and which is easy to install.

These and other objects of the present invention will become more apparent to those skilled in the art as the description of the present invention proceeds.

SUMMARY OF THE INVENTION

Briefly described, and in accordance with a preferred embodiment thereof, the present invention relates to a tow hook hitch adapted to be mounted to one, or if desired, both tow hooks of a vehicle. A first frame member is disposed above the upper surface of the tow hook, and a second frame member is disposed below the lower surface of the tow hook. The first and second frame members are, the preferred embodiment, provided by first and second plates, respectively. A hook engagement member has an outer periphery that is commensurate with the inner periphery of the tow hook for allowing the hook engagement member to fit within the hollow inner passage of the tow hook. The hook engagement member is coupled to one of the first and second frame members, and may, if desired, be integral therewith. A securing member, for example, a bolt, engages the first and second frame members for drawing the first and second frame members against the upper and lower surfaces of the tow hook, respectively, thereby securing the hitch assembly about the tow hook. This tow hook hitch assembly may be used with both closed U-shaped tow hooks and J-shaped open tow hooks.

In the preferred embodiments of the invention, the hook engagement member is shaped to conform, at least partially, to the shape of the inner periphery of the tow hook, thereby opposing pivotal movement of the hitch assembly with respect to the tow hook, even when only one tow hook is used.

In the instance wherein a bolt is used as the securing member, the bolt has a threaded end, and one of the first and second frame members includes a threaded hole that is engaged by the threaded end of the bolt. The other of the first and second frame members includes a smooth hole though which the bolt shaft extends. The shaft of the bolt passes within the inner passage of the tow hook, at least partially through the hook engagement member. A smooth passage may extend through the hook engagement member for such purpose.

In the case wherein the first and second frame members are formed by corresponding first and second plates, the hook engagement member and the tow hook are clamped, or sandwiched, between the first and second plates. In the preferred embodiment of the invention, a conventional tow hitch receiver is secured to one of the first and second plates. If desired, one such plate may include a wall extending at an angle from such plate for lying proximate to the outer periphery of the tow hook; this wall facilitates the attachment of the aforementioned tow hitch receiver. If desired, a tongue may extend at an angle from one of the plates into the inner passage of the tow hook; the tongue becomes wedged between the hook engagement member and the tow hook within the hollow inner passage of the tow hook when the hitch assembly is attached to the tow hook. In an alternate embodiment, the first and second plates are pivotally connected to each other by a hinge.

Another aspect of the present invention relates to such a hitch assembly for attachment to both first and second tow hooks of a vehicle. In this instance, a first frame member extends for at least the distance separating the first and second tow hooks from each other. A first end of the first frame member engages the first tow hook, and the second opposing end of the first frame member engages the second tow hook. A second frame member, preferably in the form of a plate, is disposed generally proximate the first end of the first frame member but disposed on an opposing side of the first tow hook. Likewise, a third frame member, preferably in the form of a plate, is disposed generally proximate the second end of the first frame member but disposed on an opposing side of the second tow hook. A first bolt extends through the hollow inner passage of the first tow hook for clamping the first tow hook between the first frame member and the second frame member. Similarly, a second bolt extends through the hollow inner passage of the second tow hook for clamping the second tow hook between the first frame member and the third frame member. Ideally, each of the second and third frame members is a plate that includes a hook engagement member. Each such hook engagement member has an outer periphery commensurate with the inner periphery of the respective tow hook in which it extends, and the respective securing bolt extends at least partially through each such hook engagement member. Preferably, a conventional tow hitch receiver is secured centrally to the first frame member.

Yet another aspect of the present invention relates to a method of securing a tow hitch assembly to a tow hook of a vehicle. In practicing such new method, a hook engagement member is provided having an outer periphery that is commensurate with the inner periphery of the tow hook, thereby allowing the hook engagement member to fit within the hollow inner passage of the tow hook; preferably, the hook engagement member is shaped to conform to at least a portion of the shape of the inner periphery of the tow hook, thereby opposing pivotal movement of the hitch with respect to the tow hook. Alternatively, the hook engagement member includes opposing sides that engage opposing sides of the inner periphery of the tow hook. In any event, the hook engagement member is inserted within the hollow inner passage of the tow hook to engage at least a portion of the outer periphery of the hook engagement member with at least a portion of the inner periphery of the tow hook. The hook engagement member is secured to the tow hitch assembly, and the tow hitch assembly is then clamped about the upper and lower surfaces of the tow hook to maintain the hook engagement member in place within the hollow inner passage of the tow hook. This clamping step is preferably performed by disposing a first portion of the hitch assembly above the upper surface of the tow hook, disposing a second, separable portion of the hitch assembly below the lower surface of the tow hook, securing the hook engagement member to one of the aforementioned first and second portions of the hitch assembly, and then drawing the first and second portions of the hitch assembly toward one another to clamp the hitch to the tow hook. This drawing step is preferably achieved by extending a bolt through a smooth hole in one of such portions, through the inner passage of the tow hook, and into a threaded hole formed in the second of such portions, and then tightening the bolt.

BRIEF DESCRIPTION OF THE DRAWINGS

FIG. 1 is a perspective view of a receiver hitch assembly, including a tow hook, in accordance with a first embodiment of the present invention.

FIG. 2 is a sectional view of the assembly of FIG. 1, showing the tow hook mounted within the assembly.

DETAILED DESCRIPTION OF THE PREFERRED EMBODIMENTS

Figure 3:
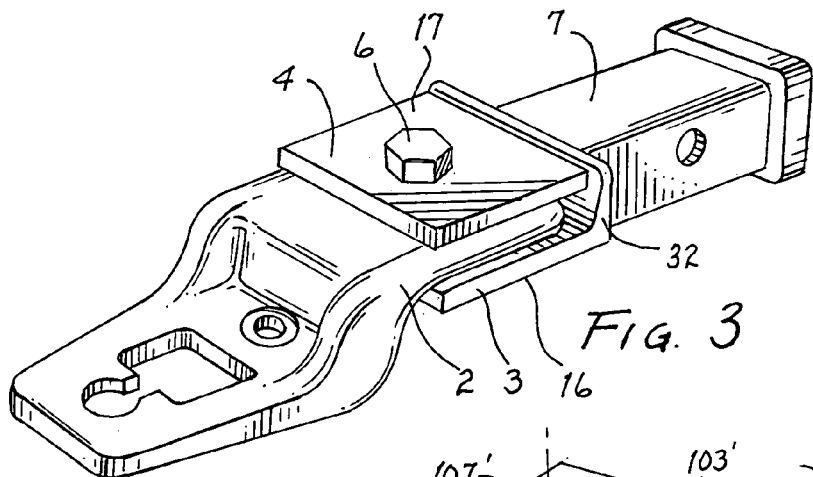
FIG. 3 is a view similar to FIG. 1, showing the tow hook mounted within the assembly, the view being rotated 180° (i.e., upside down) from that of FIG. 1.

FIGS. 1–3 illustrate a receiver hitch assembly 1 for a tow hook 2 according to a first embodiment of the present invention. While tow hook 2 is shown as being in the form of a U-shaped closed hook, it could also be a J-shaped, open hook. The hitch assembly includes first and second frame members 3 and 4, corresponding to plates 16 and 17. The hitch assembly also includes a hook engagement member 5 and a securing member shown in the form of a bolt 6. As shown in FIGS. 1 and 2, hook engagement member is integral with plate 4/17, although it could alternatively be made separate from, and then attached (as by welding), to plate 4/17. Moreover, while hook engagement member 5 is shown as being secured to, or integral with plate 4/17, it could instead be secured to, or integral with, plate 3/16.

The hitch assembly further includes a square-channel tubular receiver 7 welded at one end thereof to plate 3/16. As shown in FIGS. 1–3, plate 3/16 preferably includes a reinforcing side wall 32 extending approximately perpendicular therefrom, and receiver 7 can be simultaneously welded to both plate 3/16 and side wall 32. Side wall 32 abuts the outer periphery of tow hook 2 and facilitates proper positioning and alignment of upper plate 3/16 during installation. If desired, receiver 7 could instead by secured to lower plate 4/17. Incidentally, those skilled in the art will appreciate that hitch assembly 1 may be installed over tow hook 2 with either plate 3/16 on top or plate 4/17 on top. Receiver 7 is of conventional style for receiving a tow ball, winch, or other accessory. All components of the hitch assembly are preferably made of steel.

When attaching hitch assembly 1 to tow hook 2, plate 4 and hook engagement member 5 are positioned below tow hook 2. Bolt 6 passes through smooth holes formed in plate 4 and hook engagement member 5. Plate 3 is then positioned above tow hook 2, and threaded hole 90 formed in plate 3 is aligned with the threaded end of bolt 6. Bolt 6 is then tightened. Consequently, hook 2 and engagement member 5 are sandwiched between first and second plates 3 and 4, and threaded bolt 6 holds the assembly together, as illustrated in FIGS. 2 and 3. A highly secure connection is thereby achieved, and the resulting connection resists any twisting or pivotal loads. It should be noted that, while a bolt 6 and threaded hole other members for securing the components of the assembly together may be used, such as a clamp, for example.

Hook engagement member 5 fits within the inner region 8 of tow hook 2, and is also shaped to engage at least a portion of the inner peripheral side areas 9 of inner region 8, thereby opposing pivotal motion of tow hook 2 with respect to hitch assembly 1. Hook engagement member 5 may further be specifically molded or shaped to conform to any portion, or the entire peripheral area, of the inner region 8 of tow hook 2. Described hitch assembly 1 may be used with any type of hook, including U- and J-shaped hooks.

Still referring to FIGS. 1–3, tow hook 2 is U-shaped and includes opposing front and back regions 10 and 11. Front region 10 is curved, while back region 11 is relatively straight. Front and back regions 10 and 11 are connected to each other by opposing side regions 12 and 13. Side regions 12 and 13 each have a jut, 14 and 15 respectively, protruding inwardly toward the center of inner region 8. Hook engagement member 5 shown in FIGS. 1 and 2 covers substantially all of the inner region 8 of tow hook 2. Hook extending member 5 includes front and back walls, 18 and 19, as well as side walls 20 and 21. Front wall 18 is curved, while back wall 19 is straight, thereby conforming to the shape of the front and back regions 10 and 11, respectively, of tow hook 2. Straight side walls 20 and 21 contact the inwardly directed juts 14 and 15 on the side regions 12 and 13 of tow hook 2. If desired, side walls 20 and 21 of hook engagement 5 could include grooves, or indented regions, to matingly receive juts 14 and 15.

Figure 4:
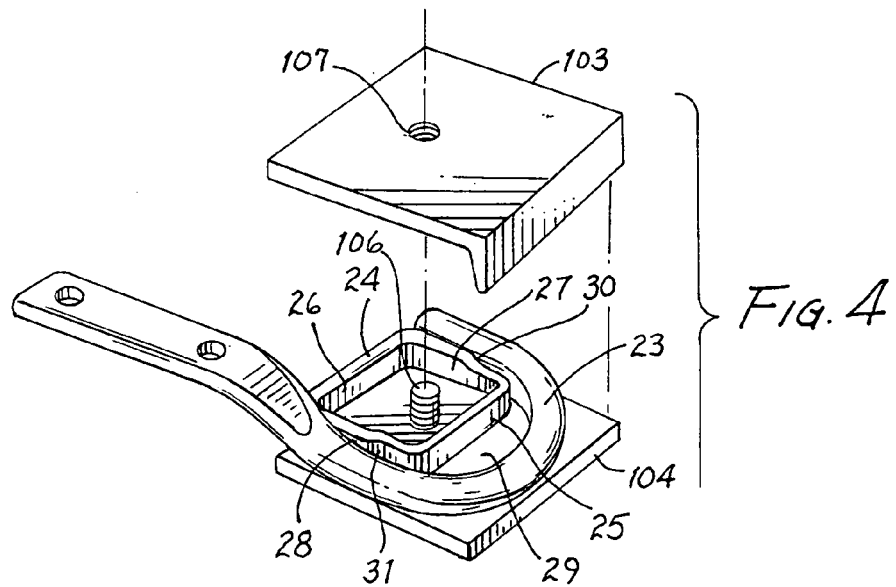
FIG. 4 is a perspective view of a receiver hitch assembly, including a tow hook partially mounted within the assembly, in accordance with a second embodiment.

An alternate embodiment of the present invention is illustrated in FIG. 4, shown for use with a J-shaped tow hook 23. Lower plate 104 includes hook engagement member 24. Hook engagement member 24 is formed from front wall 25, back wall 26, side wall 27, and side wall 28, rather than being a solid mass. Side walls 27 and 28 of hook engagement member 24 contact opposing inner-peripheral side walls 30 and 31 of the inner region 29 of tow hook 23, conforming thereto. The threaded end of bolt 106 engages threaded hole 107 in plate 103 to clamp the hitch assembly together.

Figure 5:
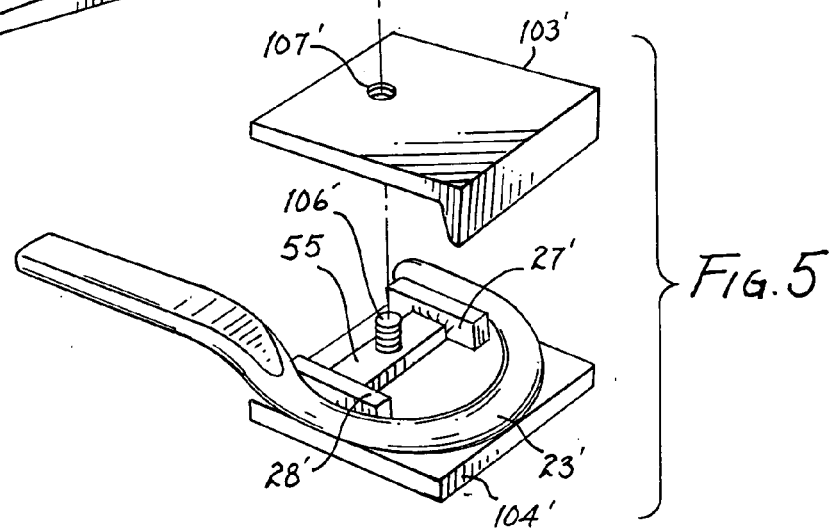
FIG. 5 is a perspective view of a receiver hitch assembly, including a tow hook partially mounted within the assembly, in accordance with a third embodiment.

Yet another embodiment of the present invention, shown in FIG. 5, includes an engagement member omitting front and back walls, but retaining side walls 27' and 28' for engaging the opposing inner-peripheral side walls of tow hook 23'. In the embodiment of FIG. 5, an inner cross wall 55 extends between the two side walls 27' and 28' for added reinforcement.

Though tow hitch assembly 1 of FIGS. 1–3 is illustrated as including only one side wall 32, the first and second frame members, or plates, of the tow hitch may include additional side walls extending from such plates. For example, frame member 3 of FIGS. 1–3 may include two additional and opposite side walls extending from plate 16 and adjacent to the wall 32 to form a pocket extending around the hook.

Figure 6:
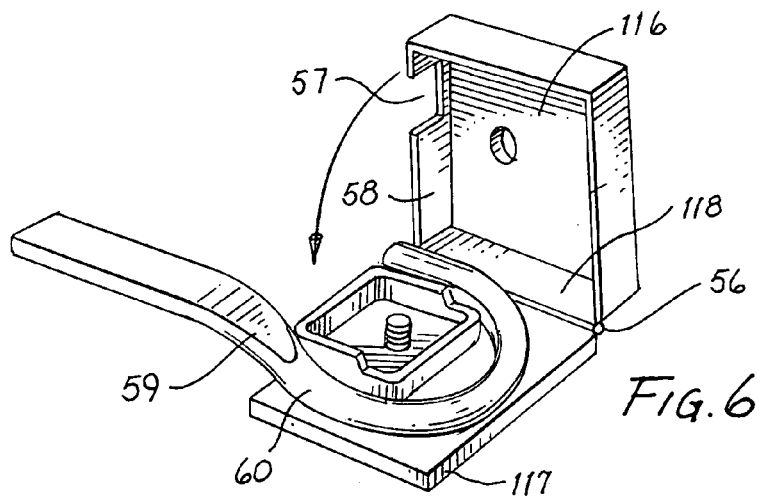
FIG. 6 is a perspective view of a receiver hitch assembly, including a tow hook partially mounted within the assembly, in accordance with a fourth embodiment.

Also, as illustrated in FIG. 6, frame members 116 and 117 may be connected by a side wall 118 having a hinge connection 56 between the plates of such frame members. Furthermore, as shown in FIG. 6, side wall 58 extends across tow hook 60 and includes an opening 57 so as not to obstruct mounting and assembly of the tow hitch assembly to tow hook 60. Opening 57 accommodates passage of arm 59 of tow hook 60; two such openings may be included to accommodate passage of a U-shaped hook.

Figure 7:
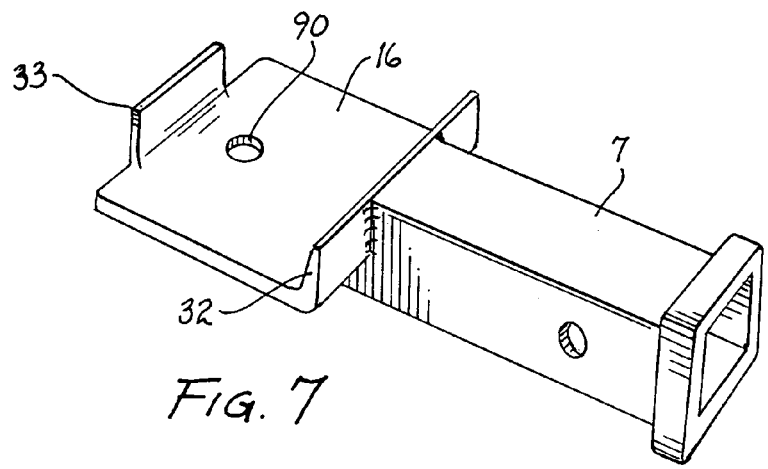
FIG. 7 is a perspective view of a receiver hitch assembly, including a tow hook partially mounted within the assembly, in accordance with a fifth embodiment.

A further embodiment is illustrated in FIG. 7, using the same reference numerals as in FIGS. 1–3, wherein the frame member 3 includes an additional truncated wall, or tongue 33, opposite wall 32, which wedges between hook engagement member 5 and back wall 11 of the inner region 8 of tow hook 2.

Figure 8:
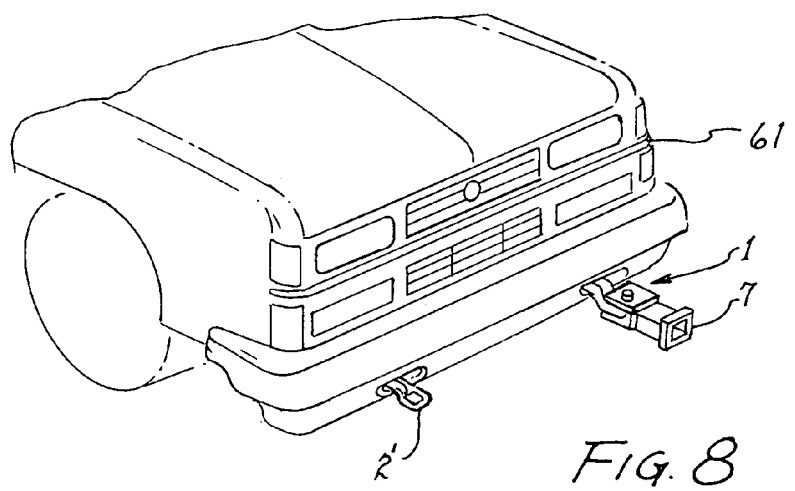
FIG. 8 is a perspective view of a receiver hitch assembly, in accordance with the present invention, mounted to one tow hook of a vehicle.

The assembly illustrated in FIGS. 1–7 may be used to attach a receiver to only one tow hook of a vehicle 61, as illustrated in FIG. 8. Alternatively, at least one frame member may span virtually the length of the vehicle bumper for attachment of a tow hitch assembly to both front tow hooks, as shown in FIGS. 9 and 10.

Figure 9:
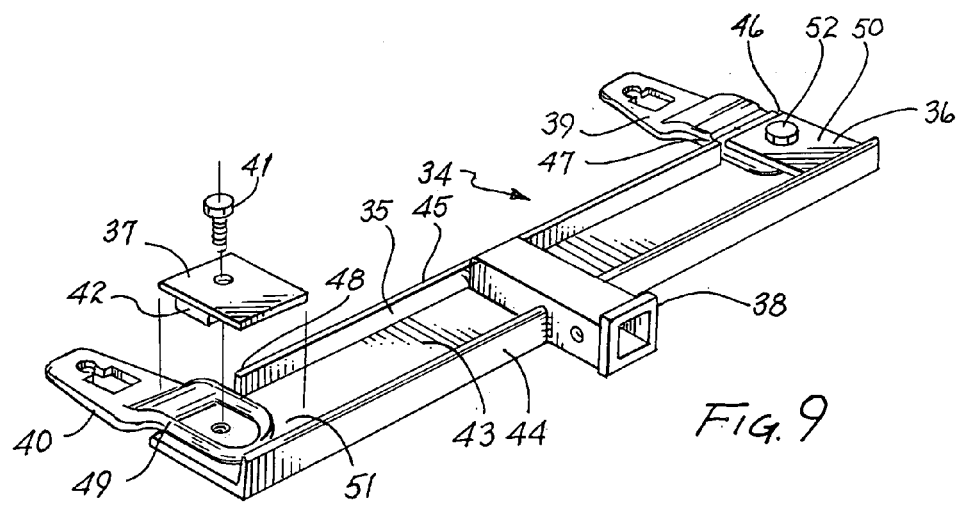
FIG. 9 is a perspective view of a receiver hitch assembly, configured for mounting two tow hooks of a vehicle, in accordance with a sixth embodiment.
Figure 10:
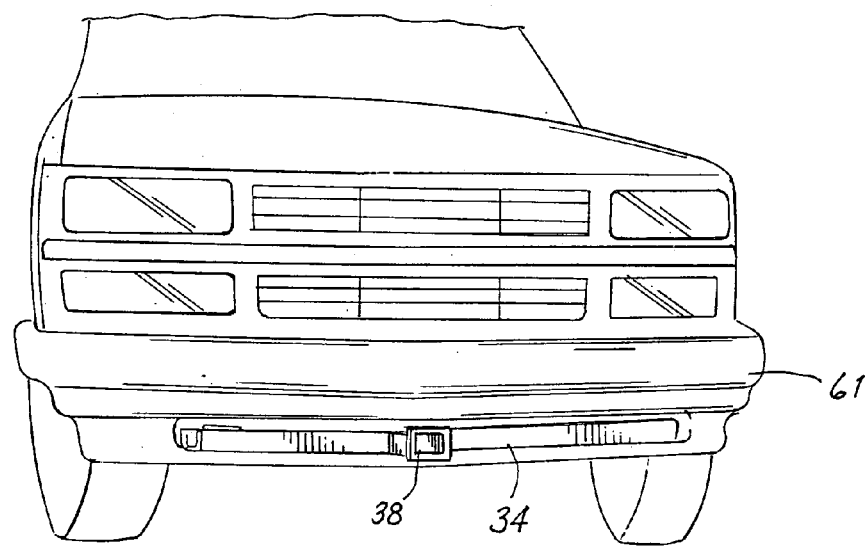
FIG. 10 is a perspective view of the receiver hitch assembly of FIG. 9 mounted to a vehicle.

FIG. 9 illustrates a tow hitch assembly 34 configured for mounting to two vehicle tow hooks 39 and 40, disposed on the right and left sides of a vehicle bumper. The assembly 34 comprises a first elongated frame member 35, a second frame member in the form of a short plate 36, and a third frame member in the form of a short 37. Tow hitch receiver is centrally mounted attached to first frame member 35. Bolts 41 and 52 are installed on either side to secure the assembly together. Additionally, a right side hook engagement member (not visible) and a left side hook engagement member 42, are preferably formed integral with plates 36 and 37. The first frame member 35 spans the distance between vehicle hooks 39 and 40. The left end 51 of first frame member 35 is disposed below tow hook 40, and the right end 50 of first frame member 35 is disposed below tow hook 39. The first frame member 35 further includes a bottom horizontal plate 43, front wall 44, and rear wall 45. Back wall 45 stops short at ends 47 and 48 to avoid interference with the passage of tow hooks 39 and 40. The assembly 34 is shown mounted to vehicle 61 in FIG. 10. When installing assembly 34 of FIGS. 9 and 10 on vehicle 61, a user separately secures each end 50 and 51 of first frame member 35 to tow hooks 39 and 40, using the procedure already described above in conjunction with FIGS. 1–8.

Those skilled in the art will now appreciate that an improved tow hitch assembly has been described. The tow hitch assembly is securely mounted to one or both of the vehicle tow hooks by effectively clamping the tow hook between upper and lower frame plates. This configuration provides for a sturdy mounting to the tow hook, as the hook engagement member prevents pivotal movement of the hitch assembly relative to the tow hook. The assembly may be used with a variety of different tow hooks including "U" and "J"-shaped hooks. Additionally, the assembly is easy to install, and may be used with one or both hooks of a vehicle. Various modifications and changes may be made to the described embodiment by those skilled in the art without departing from the true spirit and scope of the invention as defined by the appended claims. For example, the threaded end of the bolt used to secure the hitch assembly together may engage a threaded passage formed within the hook engagement member coupled to, or integral with, one of the frame members, rather than threadedly engaging a hole within the frame member itself.

I claim:

1. A method of securing a hitch to a tow hook extending from the front portion of a vehicle, the tow hook having an inner periphery bounding a hollow inner passage, the tow hook having upper and lower opposing surfaces, said method comprising the steps of:
   a. providing a hook engagement member on said hitch, said hook engagement member having an outer periphery commensurate with the inner periphery of said tow hook for allowing said hook engagement member to fit within the hollow inner passage of the tow hook;
   b. inserting said hook engagement member within the hollow inner passage of said tow hook and engaging the outer periphery of said hook engagement member with at least a portion of the inner periphery of said tow hook; and
   c. clamping the hitch about the upper and lower surfaces of the tow hook to maintain said hook engagement member in place within the hollow inner passage of the tow hook.

2. The method of claim 1 wherein the inner periphery of the tow hook is of a predetermined shape, and wherein said hook engagement member is shaped to conform to at least a portion of the predetermined shape of the inner periphery of the tow hook to oppose pivotal movement of the hitch with respect to the tow hook.

3. The method of claim 1 wherein the inner periphery of the tow hook includes opposing sides, and wherein said insertion step includes the step of engaging the outer periphery of said hook engagement member with said opposing sides.

4. The method of claim 1 wherein said tow hook is a closed U-shaped hook.

5. The method of claim 1 wherein said tow hook is a J-shaped open hook.

6. The method of claim 1 wherein said clamping step includes the steps of:
   i. disposing a first portion of said hitch above the upper surface of the tow hook;
   ii. disposing a second portion of said hitch below the lower surface of the tow hook;
   iii. securing the hook engagement member to one of said first and second portions of said hitch; and
   iv. drawing said first and second portions of said hitch toward one another to clamp the hitch to the tow hook.

7. The method of claim 6 wherein said step of drawing said first and second portions of said hitch toward one another includes the steps of:
   i. forming a first smooth hole in one of said first and second portions, the first smooth hole being generally aligned with the hollow inner passage of the tow hook;
   ii. forming a second threaded hole in the other of said first and second portions, the second threaded hole being generally aligned with the hollow inner passage of the tow hook and with the first smooth hole;
   iii. inserting a threaded end of a clamping bolt through the smooth hole, through the hollow inner passage of the tow hook, and into the threaded hole; and
   iv. tightening the clamp bolt.

* * * * *